Figure 1:
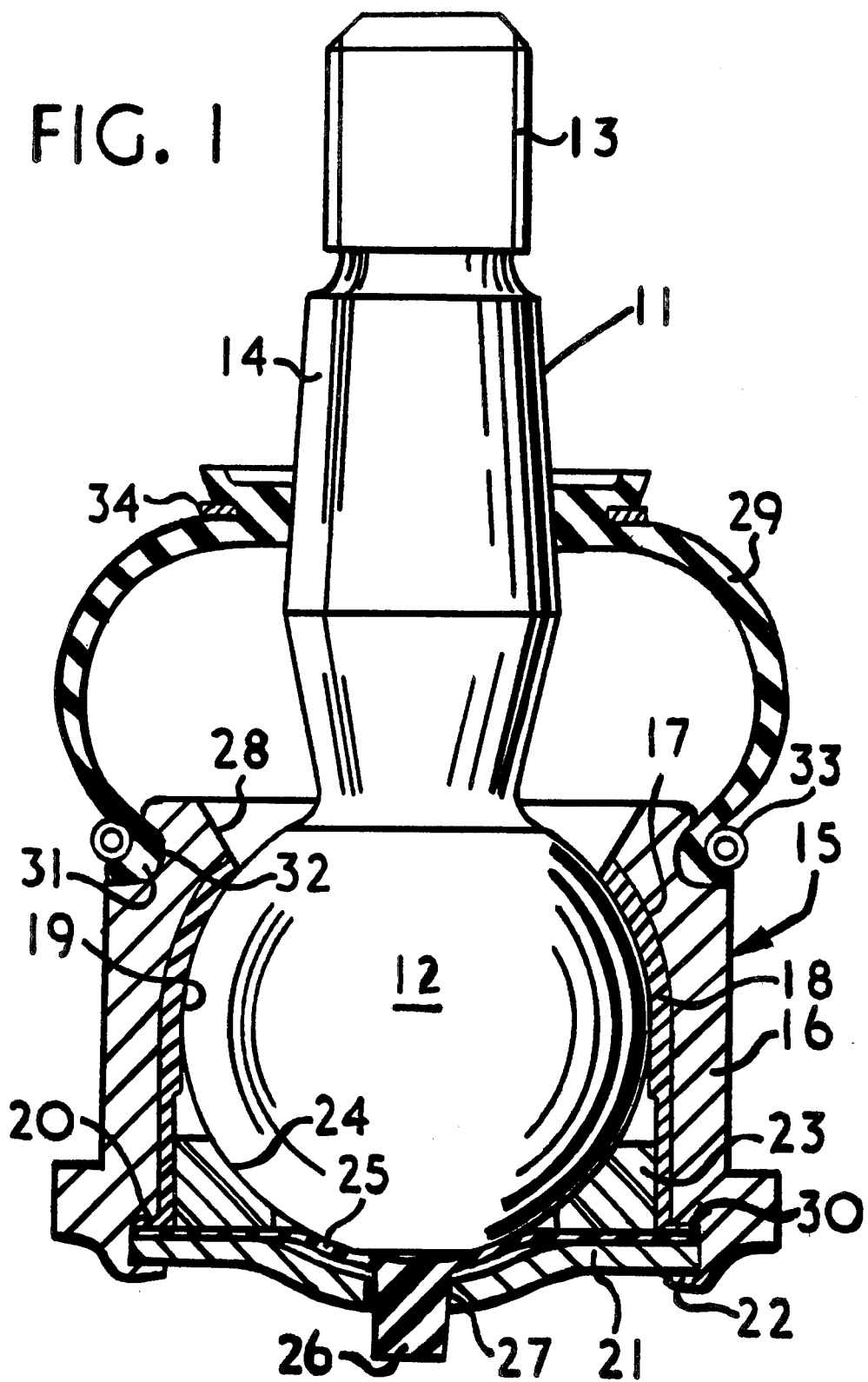

United States Patent [19]

Farrant

[11] 4,017,197
[45] Apr. 12, 1977

[54] BALL JOINT WITH WEAR INDICATOR MEANS

[75] Inventor: David John Rowland Farrant, Leamington Spa, England

[73] Assignee: Automotive Products Company Limited, England

[22] Filed: Dec. 16, 1975

[21] Appl. No.: 641,158

[30] Foreign Application Priority Data

Dec. 23, 1974 United Kingdom ............ 55459/74

[52] U.S. Cl. .................................. 403/27; 403/138; 403/132; 403/288
[51] Int. Cl.² ......................................... F16C 11/06
[58] Field of Search ............ 403/27, 138, 139, 135, 403/132, 133, 140, 288; 116/114 Q

[56] References Cited
UNITED STATES PATENTS

| | | |
|---|---|---|
| 3,211,483 | 10/1965 | Sullivan, Jr. ...................... 403/140 |
| 3,308,906 | 3/1967 | Burke ................................ 403/140 |
| 3,486,778 | 12/1969 | Herbenar et al. ................. 403/140 |
| 3,677,585 | 7/1972 | Scheerer ........................... 403/140 |
| 3,813,178 | 5/1974 | Herbenar et al. .................. 403/27 |
| 3,817,640 | 6/1974 | Carter et al. ...................... 403/138 |
| 3,890,052 | 6/1975 | Herbenar et al. .................. 403/27 |

Primary Examiner—Andrew V. Kundrat
Attorney, Agent, or Firm—Lawrence J. Winter

[57] ABSTRACT

The invention is concerned with a pivot joint having means for indicating wear thereof. The pivot joint comprises a headed pin, a socket in which the head is engaged and from which the pin projects, mating bearing surfaces on the head and the socket such that the pin is movable angularly with respect to the socket, a wear indicator extending through an aperture in the sockets and having its inner end engageable with the head, and a diaphragm which extends between the indicator and the socket to seal the bearing surfaces against ingress of foreign matter through the aperture.

6 Claims, 5 Drawing Figures

BALL JOINT WITH WEAR INDICATOR MEANS

The invention relates to pivot joints.

A typical pivot joint incorporates a headed pin rotatably mounted in a socket and restrained against endwise movement therein by mating bearing surfaces on a head of the pin and the socket. Many such joints are intended for use in conditions where the pin is subjected in use to end loads acting wholly or mainly in one direction so that wear takes place primarily in the bearing surfaces which resist movement of the pin relative to the socket in that direction. One example of such use of a joint is in the suspension system of a motor road vehicle. One danger which arises is that the joint can wear to such an extent that the head of the pin can be pulled out of the socket resulting in sudden complete collapse of the suspension. Imminent collapse may not be detected because the static load on the joint disguises the extent of axial movement possible due to wear. The present invention is concerned with a means for detecting wear in pivot joints and is particularly but not exclusively applicable to pivot joints in which end loads and thus wear take place primarily in one direction.

According to the present invention a pivot joint comprises a headed pin, a socket in which the head is engaged and from which the pin projects, mating bearing surfaces on the head and the socket such that the pin is movable angularly with respect to the socket, a wear indicator extending through an aperture in the socket and having its inner end engageable with the head, and a diaphragm extending between the indicator and the socket to seal the bearing surfaces against ingress of foreign matter through the aperture. In use, the extent to which the indicator moves into the socket or can be moved into the socket gives an indication of the extent of wear of the bearing surfaces and enables the joint to be replaced before it wears to a dangerous extent.

An embodiment of the invention will be described by way of example with reference to the accompanying drawings in which:

FIG. 1 is a cross-section through a pivot joint according to the present invention; and FIGS. 2, 3, 4 and 5 are cross-sections of parts of pivot joints similar to that of FIG. 1 but showing various modifications.

The pivot joint shown in FIG. 1 is a ball and socket joint such as may be employed in a motor vehicle suspension. The joint incorporates a pin 11 which at its lower end incorporates a generally spherical head 12. The pin is formed of hardened steel so that the surface of the head 12 forms a wear resistant bearing surface. The upper end of the pin 11 is screw threaded at 13 and below the threaded portion 13 is a tapered portion 14. The pin can be mounted to one of two co-operating members which are to pivot with respect to each other by inserting the tapered portion 14 in a correspondingly tapered hole and applying a nut to the threaded portion 13 to grip the pin in the tapered hole by a wedging action.

The head 12 is enclosed within a socket 15. The socket comprises a generally cylindrical steel housing 16 the inner surface of which tapers inwardly near its upper end as shown at 17. The housing is in use secured in the second of two co-operating members which are to pivot with respect to each other. The housing 16 incorporates a bearing sleeve 18 which has a part spherical inwardly directed bearing surface 19 which mates with the bearing surface of the head 12. The lower end of the housing 16 is closed by a cover plate 21 which is inserted into a larger diameter lower portion of the housing 16 and held in position by turned-over flange 22. The cover plate 21 serves to hold an annular bearing member 23 with a part spherical surface 24 in engagement with the bearing surface of the head 12 in order to hold the head in contact with the bearing surface 19 of bearing sleeve 18. The bearing member 23 is formed of a plastics material such as polyurethane.

A flexible diaphragm 25 is interposed between the cover plate 21 and the annular bearing member 23 and this diaphragm is also secured to the housing 16 around its periphery by means of the cover plate 21 and its turned-over flange 22. An indicator 26 is moulded integrally with diaphragm 25 and extends downwardly through an aperture 27 in the cover plate 21. A bottom flange 20 of the bearing sleeve 18, and the outer peripheries of the diaphragm 25 and cover plate 21 are all gripped firmly between a shoulder 30 on the housing and the turned-over flange 22.

The pin 11 extends upwardly through an aperture 28 in the upper end of the housing 16 with sufficient clearance to allow substantial angular deflection of the pin 11 with respect to the housing 16. The aperture 28 is closed-off by a conventional flexible rubber boot 29. The lower end of the boot has a bead 31 secured in a groove 32 near the upper end of the housing 16 by means of a resilient wire ring 33. The upper end of the rubber boot 29 is a close fit on the tapered part 14 of the pin 11 and is supported by a metal ring 34.

The pivot joint described above is intended to be used in the situation where a first member secured to the pin 11 is loaded normally in an upward direction with respect to a second member supporting the socket 15. The first member is thus freely articulated to the second member in that it is able to move angularly in rotation about the axis of the pin 11 and is also able to move angularly in such a way that the axis of the pin takes up a different orientation. However the invention could be applied to a joint allowing only one of these modes of angular movement. The surface 19 of bearing sleeve 18 provides the primary bearing surface for the mating bearing surface of the spherical head 12. Bearing surface 24 of the annular bearing member 23 serves primarily for location purposes as the main load is away from this bearing surface. In use, the bearing surface 19 tends to wear and this wear can be such that bearing sleeve 18 wears away completely. Metal to metal contact between the head 12 and the housing 16 would then cause rapid further wear which could eventually result in the spherical head 12 being pulled out through the aperture 28. The wear indicator 26 provides a means of inspecting the pivot joint for wear so that the joint can be replaced before any danger arises or before the efficiency of the joint is impaired by a substantial degree of free play. As the bearing surface 19 wears the head 12 moves in an upward direction under the prevailing load. This allows the head 26 to move into the interior of the socket 15 to a greater extent until it again contacts the spherical head 12. Thus the extent to which the indicator 26 projects beyond the cover plate 21 when it is in contact with the spherical head 12 is a measure of the extent to which the pivot joint has worn. The indicator may incorporate markings which indicate that the pivot joint should be replaced when the marking coincides with the surface of the cover plate 21 or preferably the length of the indicator 26 is such that it lies flush with the cover plate 21 at the stage when the joint should be replaced. In this embodiment it is necessary to apply light pressure to the indicator 26 to move it into contact with the spherical head 12 to measure the extent of wear but as an alternative the indicator may be spring-loaded towards the spherical head 12.

The presence of the diaphragm 25 seals the bearing surfaces of the pivot joint against ingress of dirt or moisture to the bearing surfaces through the aperture 27 and thus ensures that the life of the joint is not impaired by the provision of the wear indicator.

Figure 2:
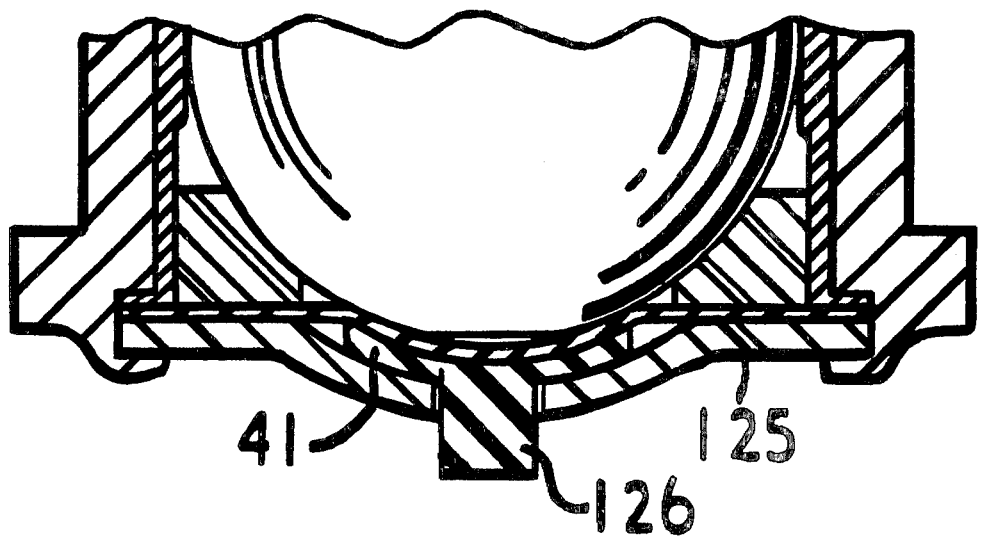

The pivot joint shown partially in FIG. 2 corresponds generally to that shown in FIG. 1 but the diaphragm 125 of FIG. 2 is a separate component from the indicator 126 of FIG. 2. The indicator 126 incorporates a flange 41 which prevents the indicator from falling out of its aperture. The provision of separate diaphragms and indicators enables these two components to be made from different materials where this is appropriate. For example, there may be problems in moulding some materials to the form of the combined diaphragm and indicator of FIG. 1 whereas in the case of FIG. 2 the diaphragm could be formed from flat sheet material while the indicator is a moulding. In this embodiment the indicator 126 bears against the pin through the intermediary of the diaphragm 125.

Figure 3:
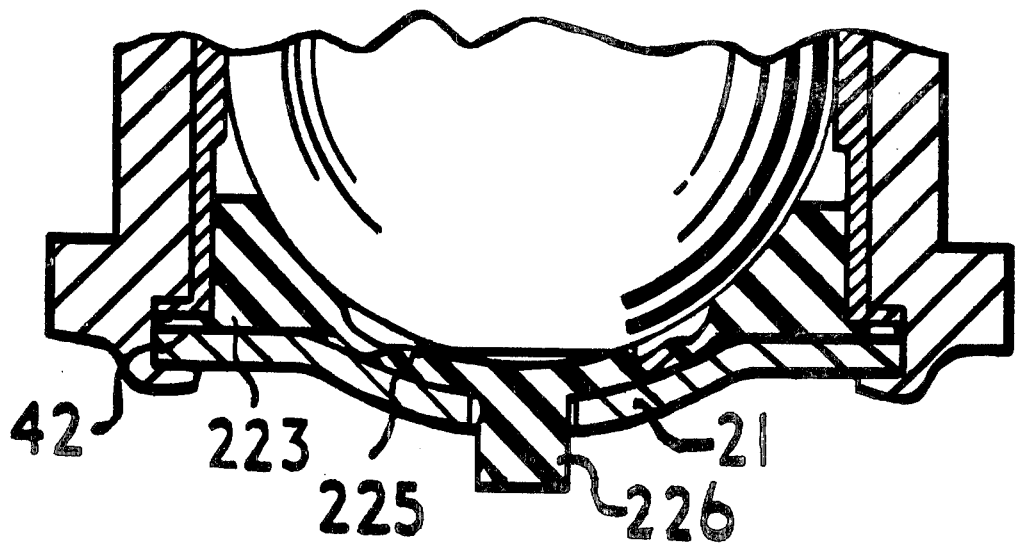

A further slight modification is shown in FIG. 3. In this modification an annular bearing member 223 (corresponding to the bearing member 23 of FIG. 1) is moulded integrally with a diaphragm 225 and an indicator 226. The annular bearing member 223 also incorporates an externally directed flange 42 which is interposed between the cover plate 21 and a shoulder of the housing 16 to maintain the bearing member 223 in position even after wear of the joint. It is particularly important in this embodiment to maintain the bearing member in its appropriate position because the bearing member locates the diaphragm 225.

Figure 4:
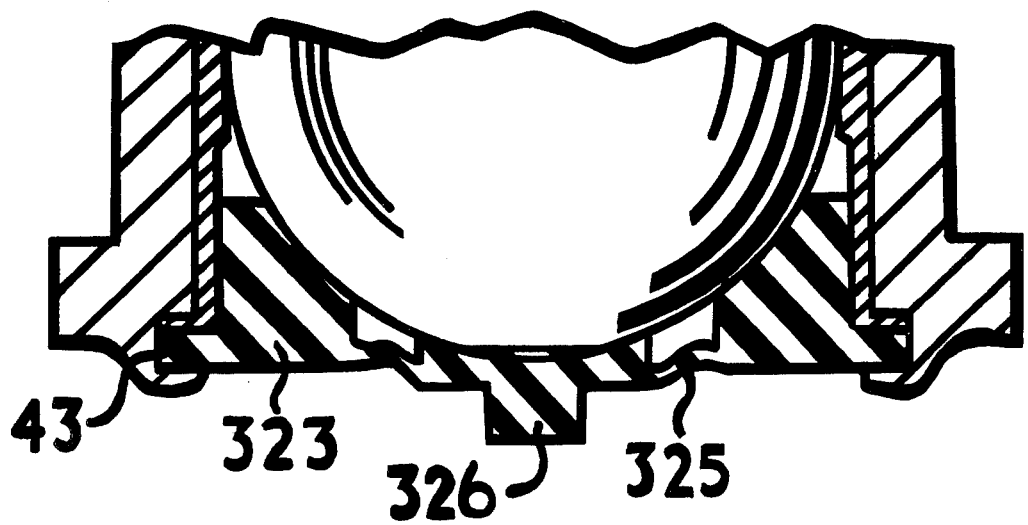

FIG. 4 shows a modification in which no separate cover plate 21 is employed. Instead, the annular bearing member 323 (corresponding to bearing member 23 of FIG. 1) incorporates a substantial outwardly directed flange 43 which serves to locate the bearing member 323 with respect to the housing 16. As in the embodiment of FIG. 3, the indicator 326 and diaphragm 325 are moulded integrally with the annular bearing member 323.

Figure 5:
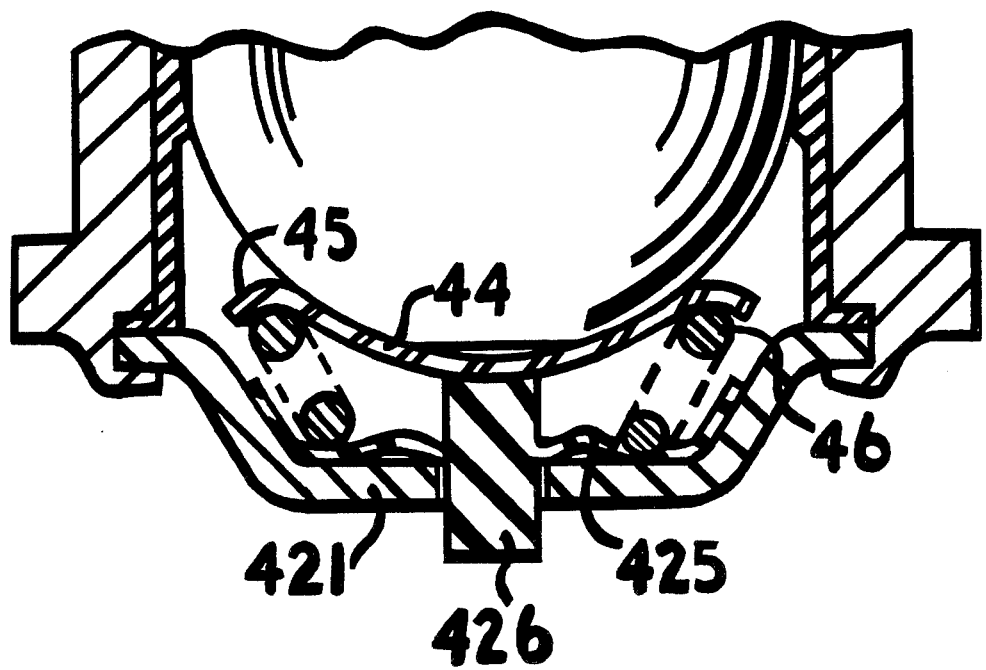

FIG. 5 shows a further modification. In place of the annular bearing member 23 of FIG. 1 a dished circular bearing plate 44 is provided. The bearing plate 44 incorporates an outer lip 45 which serves to locate a coil spring 46 which also bears against a cover plate 421 and thus urges the bearing plate 44 into bearing contact with the spherical head 12. In this embodiment wear of the bearing sleeve 18 does not cause free play in the pivot joint because the head 12 is caused to follow up the wear under the influence of spring 46. It is particularly important in such a joint which does not exhibit free play after it has worn to provide some other means of indicating wear. As in the other embodiments a wear indicator 426 is provided to follow-up movement of the head 12 as a result of wear by virtue of contact of the indicator 426 against the bearing plate 44. Indicator 426 incorporates an integrally moulded diaphragm 425 the outer periphery of which is secured between the spring 46 and the cover plate 421. In this embodiment the indicator 426 bears against the pin through the intermediary of the bearing plate 44.

I claim:

1. A pivot joint comprising a pin having a head thereon; a socket comprising a housing receiving said head and defining a first aperture through which said pin projects; mating bearing surfaces on said head and said socket such that the pin is movable angularly with respect to the socket; a second aperture in said socket; a wear indicator received in said second aperture and having an inner end engageable with said head; and a flexible diaphragm extending between the indicator and the socket and fixedly secured around its periphery to a portion of said socket to seal the bearing surfaces against ingress of foreign matter through the second aperture.

2. A pivot joint according to claim 1, said housing being formed with an opening in the end thereof opposite said first aperture and and end cover forming part of said socket being received in said opening, said joint further comprising a bearing member and a compression spring bearing against said bearing member to urge said bearing member against the head of said pin, said bearing member bearing against said end cover through said compression spring and diaphragm disposed in contact therewith and with said end cover to fixedly secure said diaphragm to said end cover.

3. A pivot joint according to claim 1, said diaphragm and indicator being formed from a single moulding.

4. A pivot joint according to claim 3, said socket comprising an annular bearing member having a bearing surface for mating with a bearing surface of said pin, said annular bearing member being moulded integrally with said diaphragm and indicator.

5. A pivot joint according to claim 1, said housing being formed with an opening in an end thereof opposed to said first aperture, an end cover being received in said opening and incorporating said second aperture.

6. A pivot joint according to claim 1, said socket comprising an annular bearing member having a bearing surface for mating with a bearing surface of said pin, said annular bearing member, diaphragm and wear indicator being constituted by a single moulding.

* * * * *

UNITED STATES PATENT OFFICE
CERTIFICATE OF CORRECTION

Patent No. 4,017,197          Dated April 12, 1977

Inventor(s) David J.R. Farrant

It is certified that error appears in the above-identified patent and that said Letters Patent are hereby corrected as shown below:

The assignee should read as follows:

-- Automotive Products Ltd. --.

Signed and Sealed this

Twenty-third Day of May 1978

[SEAL]

Attest:

RUTH C. MASON
*Attesting Officer*

LUTRELLE F. PARKER
*Acting Commissioner of Patents and Trademarks*